Nov. 12, 1940.  J. B. McPHERSON, 4TH  2,221,646
SOLDERING DEVICE
Filed May 5, 1937

INVENTOR
John B. McPherson IV

Patented Nov. 12, 1940

2,221,646

UNITED STATES PATENT OFFICE 2,221,646

SOLDERING DEVICE

John B. McPherson, IV, Abington, Pa.

Application May 5, 1937, Serial No. 140,810

4 Claims. (Cl. 219—26)

This invention relates to apparatus for making a soldered joint or connection between metal parts. The apparatus may also be adapted for other operations of a like nature, such as for example brazing.

The device of the present invention is particularly useful where a large number of small soldered connections are required, such as in production of radio and instrument assemblies. It also gives improved quality to general soldering work and permits a saving in time.

By the use of the apparatus of the present invention, it is possible to provide for improved operation and construction as compared with the customary type of soldering iron. It is an object of the present invention to provide a soldering apparatus which is simple in construction and has a low cost, both as to manufacture and upkeep, while at the same time providing for improved operational characteristics. It is also an object of the invention to provide a soldering device which requires little skill to produce reliable soldered connections.

In the soldering device of the present invention a transformer is used to transform standard commercial voltages such as 110 and 220 volts to low voltage. If desired, the transformer can be of the type which has two sets of windings to permit connecting to an electric circuit which may be either 110 or 220 volts. The low voltage output of the transformer is connected by leads to the actual soldering apparatus. This consists mainly of a handle part having good electric and heat insulating qualities and two metal electrodes which are preferably arranged so as to be easily removed from the handle portion. The soldering operation is accomplished by placing one electrode upon each of the parts to be connected, while at the same time applying the soldering wire. The low voltage current flowing through the metal parts to be joined, causes them to heat so that when they reach the melting temperature of the solder, the connection is made. For small parts, only a very brief period is required to effect a connection. For most types of work a small transformer is sufficient. During the process, the temperature of the parts is lower than their fusion or welding temperature.

It is an object of the present invention to provide an electrical soldering apparatus which through the medium of metal electrodes causes an electrical current to flow through the part or parts to which the solder is to be applied so that the part or parts may be heated locally by the electrical current to a suitable temperature for satisfactory application of solder. It is also an object of the invention to provide a soldering apparatus which uses electrical power only during the time the actual soldering operation is taking place, thus giving high efficiency in the use of power and in addition provides a device which is available for use immediately upon connection with the source of electrical supply without an intermediate wait for heating up, as in the case of the normal soldering iron.

It is an object of the invention to provide a soldering device which can be readily adapted for special types of soldering work such as for use in restricted or normally inaccessible places.

Another object of the invention is to produce a soldering apparatus which is light in weight so as to be readily portable and also to permit an operator to use it continuously without fatigue.

A further object is to provide a soldering apparatus which may be used for the connection of small parts in a manner which permits the operator a clear view of the parts, thus permitting more accurate and reliable connections.

Another object of the invention is to provide a device which can be readily assembled or disassembled for repair or replacement of parts, or for the attachment of special electrodes for unusual types of work.

In a soldering iron of the normal type which is composed of a mass of metal heated by an electrical heating element, a large proportion of the heat generated is dissipated to the air and lost, since the heated metal mass has a large surface area, only a small part of which comes in contact with the parts being soldered. Heat radiation from the heated mass continues throughout the time the iron is connected to the electrical circuit. The heat applied to the part being soldered is conducted thereto by actual contact with the hot iron. In the soldering device of the present invention, the only time current is being used, neglecting transformer losses, is when the soldering apparatus is actually applied to the parts being soldered. It will be seen therefore that the heat generated is efficiently applied directly to the parts being soldered. The only heat reaching the soldering apparatus is that transmitted by conduction due to the actual contact of the electrodes with the heated part being soldered. Since the mass of metal and surface area of the electrodes of this device is small, it will be obvious that there will be little heat loss due to radiation to the air. In addition, because of the small amount of heat in the soldering device itself, it is easy to insulate the handle so that a short compact apparatus can be provided in comparison with the long handle required is the normal type soldering iron to position the operator's hand a sufficient distance from the heat of the iron.

In using an electric soldering iron of the normal type which depends upon a heated mass of metal for heating the parts to be soldered and melting the solder, accurate control of the heat is difficult. The application of soldering wire to the hot iron mass causes the formation of globules of solder which drop off. In many instances such globules drop into inaccessible places in the apparatus being soldered where they are difficult to remove, and where their presence may be objectionable, in that they are capable of causing short circuit. By the use of the improved soldering apparatus of this invention the formation of these globules is prevented since the solder is held against the point where connection is desired and automatically melts when the parts reach the proper temperature so that there is no sudden contact between cold soldering wire and a hot mass of metal which might cause the formation of globules.

How the foregoing objects and advantages are realized will be evident from the description of the drawings in which—

Figure 1:
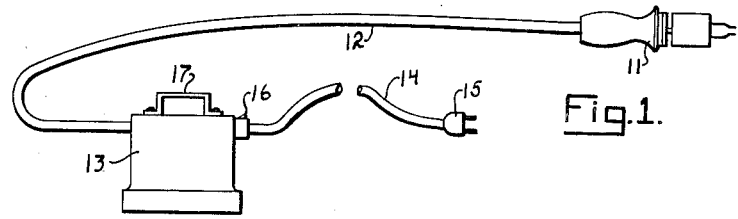
Figure 1 is a general view of the complete apparatus of the present invention.

The general view of the apparatus shown in Figure 1 discloses the soldering unit 11 which is connected by comparatively heavy insulated leads 12 to a small portable transformer 13. An ordinary insulated extension cord 14 is provided to connect the transformer to the source of electrical current as by means of plug 15. A switch 16 may also be provided to permit the operator to disconnect the transformer from the source of power without disconnecting the plug. Since the lead 12 carries a large amount of current at low voltage it must be made of comparatively large cross section wires and is also made as short as feasible in order to cut down the amount of heavy wire required so as to save cost and resistance losses. The transformer 13 is equipped with a handle 17 so that it is readily portable and can be moved by the operator to a position close to the work, thus permitting the use of a minimum length for the lead 12. The lead 14, of course, may be of any desired length since the losses will be negligible because the amount of current flowing to the transformer is low, but of high voltage.

Figure 2:
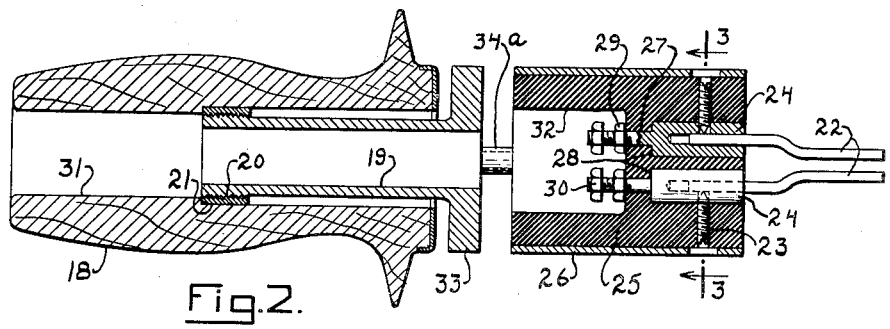
Figure 2 is a longitudinal section through the actual soldering device.
Figure 4:
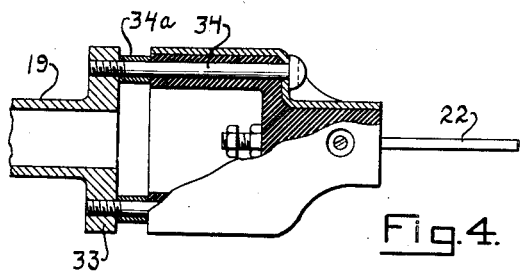
Figure 4 is a view partly in section taken generally on the line 4—4 of Figure 3.
Figure 3:
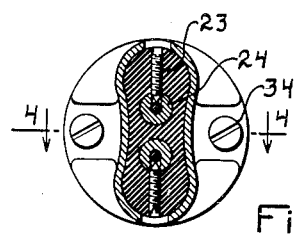
Figure 3 is a section taken on the line 3—3 of Figure 2.

In Figures 2, 3 and 4 the construction of the soldering unit 11 is shown in detail. The handle 18 is made of insulating material such as wood or Bakelite. The electrode supporting part of the unit is attached to the handle by a tubular shaped member 19 having a thread 20 which engages in a threaded metal ring 21 pressed into the bore of the handle for the purpose of providing an adequate threaded connection. The electrodes 22 may be retained as by set screws 23 in metal holders 24 which are embedded in a specially shaped part 25 made of insulating material and encased in a metal sheath 26 for additional protection. The external shape assumed by parts 25 and 26 is substantially circular at the end next the handle, but formed to a flattened or somewhat oval shape at the end where the electrodes are connected. This flattened shape gives the operator a better view of the work and allows the use of shorter electrodes. The enlarged cross section of the end next the handle is necessary to permit attachment of the rather bulky leads (shown at 12, in Figure 1) to the projections 27 of the electrode retainer 24. Shoulders 28 and nuts 29 may be used to assemble and anchor the retainer 24 in position. If desired, additional nuts 30 can be used to effect a connection between the terminals of lead 12 and the retainers 24. The electrical lead is brought in through the hole 31 of the handle 18 and the hollow member 19. The enlarged circular shaped hole 32 in part 25 provides sufficient space for the connection of the terminals of cable 12.

The electrode supporting unit is connected to the part 19 by means of bolts or screws 34 which are threaded into the heavy flange 33 of member 19. Short tubular spacers 34a are used to maintain a space between the electrode unit and the handle. This air space provides a simple means for effectively preventing heat transfer by conduction from the electrode unit to the handle, thus permitting the device to be very short and compact.

It will be observed that the tip portions of the electrodes 22 (Figure 2) are offset with respect to the ends of the electrodes which are held in the supporting unit. By releasing the set screws 23, the electrodes may be rotated to different positions so that the distances between the tips may be varied to accommodate soldering operations for many different sizes of parts.

Figure 5:
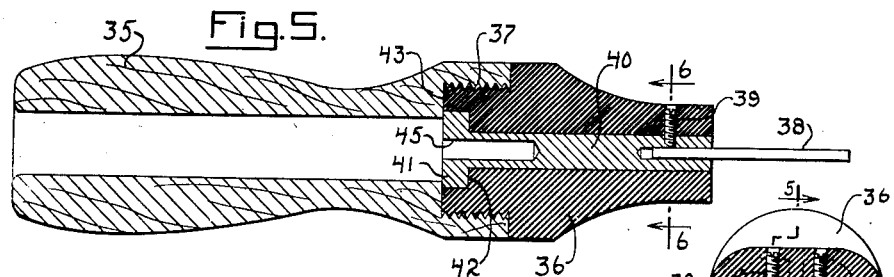
Figure 5 is a longitudinal section taken through an alternative form of the soldering device.
Figures 6, 7, 8:
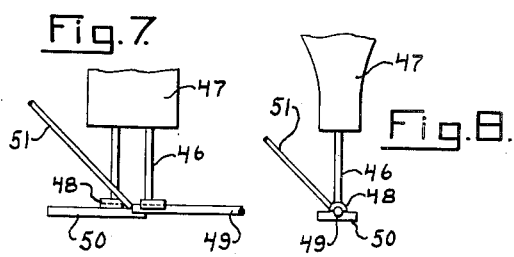
Figure 6 is a section taken on the line 6—6 of Figure 5.
Figure 7 shows a portion of the tip of the soldering apparatus with one special form of electrode in place and illustrates the manner of using the special electrodes.
Figure 8 is another view of the special electrode illustrating its shape.

Figures 5 and 6 illustrate a form of the soldering device which is of simplified construction and composed of a minimum number of parts. In this form the air space is eliminated but for most purposes a soldering device of this nature is not in continuous use and so does not heat up to a sufficient degree to be objectionable for the operator to handle. The form shown in Figure 5 has the advantage of being low in cost.

The handle 35 is directly connected to the electrode supporting unit 36 by means of threads 37. Both parts 35 and 36 are composed preferably of a molded plastic material having good insulating qualities, as well as suitable strength characteristics. The electrodes 38 are held by set screws 39 in the electrode supports 40 which may be made of a material such as copper or brass. Part 40 is made with flange portion 41 which is attached to hold the electrode retainer 40 in position due to the clamping action of shoulder 42 in part 36 and flat surface 43 in handle 35. The clamping is produced by the action of screwing the parts 35 and 36 together. Flanges 41 each have a flattened side 44, as shown in Figure 6. These flattened regions provide means for holding the electrode retainers 40 in proper insulated relationship with each other and prevent their turning. The recess at shoulder 42 is molded to fit the shape of flange 41.

This form of soldering device is readily assembled, the method of assembly being as follows. The electrical leads such as shown at 12 in Figure 1 are passed through the handle 35 and the ends of the leads connected to the parts 40 by any desired means such as silver soldering, pressing or threading into the holes 45. The assembly is then completed by sliding the insulating portion 36 over the electrode retainers 40 and screwing the handle into position.

One special form of electrode is illustrated in Figures 7 and 8. The electrodes 46 project from the tip of the soldering device 47 and are equipped with specially shaped shoes 48 at their tip. The shape of these shoes is adapted to fit along the round wire such as 49 so that contact therewith is more readily accomplished. The other shoe contacts the terminal 50 to which the wire 49 is being attached. The soldering wire 51 is held so that solder will flow between the parts 49 and 50 when the current flowing through them from one electrode to another has caused the temperature to rise sufficiently to melt the solder. It is desirable in making soldered connections in such a manner to use a soldering wire having a core of flux material.

While the metal from which the electrodes are made may vary to suit particular needs, I have found that electrodes made of an alloy of nickel, copper and zinc, such as "German silver," have desirable qualities. This material is sufficiently strong and rigid to withstand the application of pressure to the electrodes during soldering and also has the necessary characteristics to stand up under continued heating. Such electrodes are low in cost. They may also be readily bent to any desired shape to suit the particular work being soldered.

Under the usual method of using my improved type of soldering device current is available at the electrodes. When they are touched to the metal parts to be soldered, a spark or small arc often occurs at the instant of contact. At certain times it may be desirable to make a soldered joint in a place where such an arc might be objectionable, such as where certain inflammable flumes are present. Under these conditions it is possible to operate the present apparatus to make the joint without such a spark as follows. The current is cut off by means of a switch such as at 16 until such time as the electrodes are in place and firmly held against the parts to be connected. The switch is then operated to complete the electrical circuit and permit the current to flow through the parts to be soldered. As soon as they have been heated to the point where the solder has become molten, the switch is again moved to disconnect the current prior to removing the electrodes from the work.

It will be seen that the soldering apparatus of this invention is adapted for many uses and it is particularly applicable to work in connection with radio and electric instrument assemblies. I have found that an operator is able to quickly become familiar with the use of a soldering device of my improved type and by its use can increase the number, and improve the quality of connections made in a given time. This is accomplished with less effort on the part of the operator and at a lower cost for electrical power.

I claim:

1. An apparatus for making a soldered connection including a handle of insulating material, two elongated metal electrodes located in approximate parallelism, said electrodes being composed of an alloy of copper, nickel and zinc in proportions utilized in "German silver", releasable clamping means associated with said handle for supporting one end of each of said electrodes in insulated relationship, and means for supplying low voltage current to said electrodes.

2. An electrical soldering device having a handle, a pair of electrodes, electrical leads for supplying current to said electrodes, a part connected to said handle for supporting said electrodes in insulated relationship, a pair of metal conductor elements adapted for connection to the electrical leads and for holding said electrodes, an abutment in said handle adapted to contact a portion of said elements when said handle is connected to said part thereby securing said elements against movement longitudinally of the handle.

3. An electrical soldering device having two metal electrodes mounted in insulated relationship and adapted to contact with a work piece through which a heating current is to be passed and means for conducting a low voltage current to said electrodes, said electrodes being made from an alloy of copper, nickel and zinc in the general proportions utilized in "German Silver".

4. Apparatus for making a soldered connection between metal parts including means for supplying a low voltage electrical current, a handle member, two metal electrodes composed of an alloy containing chiefly nickel, copper, and zinc in proportions utilized in "German silver" and having a ductility permitting them to be bent to various shapes, said electrodes being supported in insulated relationship in said handle member and adapted to contact said metal parts, the characteristics of said means and said electrodes being such that the resistance of the metal parts being connected is utilized in raising their temperature locally between the points of contact of the electrodes.

JOHN B. McPHERSON, IV.